US011835353B2

(12) United States Patent
Correia Duarte Furtado (10) Patent No.: US 11,835,353 B2
(45) Date of Patent: Dec. 5, 2023

(54) COMPUTER IMPLEMENTED METHOD FOR GUIDING TRAFFIC PARTICIPANTS

(71) Applicant: DREAMWAVES GMBH, Vienna (AT)

(72) Inventor: Hugo Correia Duarte Furtado, Vienna (AT)

(73) Assignee: DREAMWAVES GMBH, Vienna (AT)

( * ) Notice: Subject to any disclaimer, the term of this patent is extended or adjusted under 35 U.S.C. 154(b) by 0 days.

(21) Appl. No.: 17/604,564

(22) PCT Filed: Jan. 27, 2020

(86) PCT No.: PCT/EP2020/051939
§ 371 (c)(1),
(2) Date: Oct. 18, 2021

(87) PCT Pub. No.: WO2020/211990
PCT Pub. Date: Oct. 22, 2020

(65) Prior Publication Data
US 2022/0221296 A1    Jul. 14, 2022

(30) Foreign Application Priority Data

Apr. 18, 2019   (AT) .................... A 141/2019

(51) Int. Cl.
*G01C 21/36* (2006.01)
*G01C 21/00* (2006.01)
*G01C 21/34* (2006.01)

(52) U.S. Cl.
CPC ..... *G01C 21/3638* (2013.01); *G01C 21/3461* (2013.01); *G01C 21/365* (2013.01);
(Continued)

(58) Field of Classification Search
CPC ............ G01C 21/3638; G01C 21/3461; G01C 21/3629; G01C 21/365; G01C 21/367
See application file for complete search history.

(56) References Cited
U.S. PATENT DOCUMENTS 9,464,912 B1    10/2016  Smus et al.
2004/0030491 A1*  2/2004  Hull ...................... H04W 4/024
                                                          701/433
(Continued)

FOREIGN PATENT DOCUMENTS

EP    2 711 670    3/2014
EP    2 960 630   12/2015
(Continued)

OTHER PUBLICATIONS

JP-2005326168-A English Translation.*
(Continued)

*Primary Examiner* — Rami Khatib
*Assistant Examiner* — Gabriel Joseph Rene Lambert
(74) *Attorney, Agent, or Firm* — NIXON & VANDERHYE (57) ABSTRACT

A computer implemented method for guiding traffic participants, especially pedestrians, especially visually impaired and blind people, especially for guiding in urban environments, between at least two places wherein the method contains the following steps: A. Providing a multi-modal three-dimensional map; B. Calculating a route based on the multi-modal three-dimensional map connecting the at least two places over at least one intermediate waypoint; C. Determining precise location of the traffic participant, preferably by using the multi-modal three-dimensional map; and D. Setting beacons along the path at the waypoints.

20 Claims, 9 Drawing Sheets

(52) U.S. Cl.
CPC ....... *G01C 21/367* (2013.01); *G01C 21/3629* (2013.01); *G01C 21/3841* (2020.08); *G01C 21/3852* (2020.08)

(56) References Cited

U.S. PATENT DOCUMENTS

| | | | | |
|---|---|---|---|---|
| 2006/0184314 | A1* | 8/2006 | Couckuyt | G01C 21/3423 340/995.19 |
| 2014/0379251 | A1* | 12/2014 | Tolstedt | G01C 21/206 701/410 |
| 2015/0330787 | A1* | 11/2015 | Cioffi | G01C 21/3641 701/538 |
| 2017/0003132 | A1* | 1/2017 | Kim | G06V 20/20 |
| 2018/0356233 | A1* | 12/2018 | Baqain | H04M 1/72412 |

FOREIGN PATENT DOCUMENTS

| | | | |
|---|---|---|---|
| FR | 3 038 101 | 12/2016 | |
| JP | 2005-326168 | 11/2005 | |
| JP | 2005326168 A * | 11/2005 | ............ G01C 21/00 |
| WO | 2017/114581 | 7/2017 | |
| WO | 2019/067443 | 4/2019 | |

OTHER PUBLICATIONS

P. Chanana, et al., "Assistive technology solutions for aiding travel of pedestrians with visual impairment", Journal of Rehabilitation and Assistive Technologies Engineering, 2017 [submission pending].

J. Schaap, "Towards a 3D geo-data model to support pedestrian routing in multimodal public transport travel advices", Master Thesis, TU Delft, 2010 [submission pending].

J. Schapp, et al., "Towards a 3D geo-data model to support pedestrian routing in multimodal public transport travel advices", UDMS Annual 2011—Proceedings of the Urban Data Management Society Symposium 2011, 2012 [submission pending].

P. Strumillo, et al., "Different Approaches to Aiding Blind Persons in Mobility and Navigation in the 'Naviton' and 'Sound of Vision' Projects", in: Pissaloux E., Velázquez R. (eds.), Mobility of Visually Impaired People, Springer, 2018 [submission pending].

Andreas WENDEL, et al., "Natural landmark-based monocular localization for MAVs", Robotics and Automation (ICRA), 2011 IEEE International Conference on, IEEE, May 9, 2011, pp. 5792-5799 [submission pending].

Search Report for AT Application No. 1B A 141/2019 - 1 dated Mar. 10, 2020, 3 pages.

International Search Report and Written Opinion of the ISA for PCT/EP2020/051939 dated Jun. 24, 2020, 18 pages.

P. Chanana, et al., "Assistive technology solutions for aiding travel of pedestrians with visual impairment", Journal of Rehabilitation and Assistive Technologies Engineering, 2017, vol. 4, pp. 1-16.

J. Schaap, "Towards a 3D geo-data model to support pedestrian routing in multimodal public transport travel advices", Master Thesis, TU Delft, 2010, (102 total pages).

J. Schapp et al., "Towards a 3D geo-data model to support pedestrian routing in multimodal public transport travel advices", UDMS Annual 2011—Proceedings of the Urban Data Management Society Symposium 2011, 2012, pp. 59-76.

P. Strumillo, et al., "Different Approaches to Aiding Blind Persons in Mobility and Navigation in the 'Naviton' and 'Sound of Vision' Projects", in: Pissaloux E., Velázquez R. (eds.), Mobility of Visually Impaired People, Springer, 2018, pp. 435-468.

A. Wendel et al., "Natural Landmark-based Monocular Localization for MAVs", Robotics and Automation (ICRA), 2011 IEEE International Conference on, IEEE, May 9, 2011, pp. 5792-5799.

Communication pursuant to Article 94(3) EPC issued in European Patent Application No. 20 702 283.1 dated Jul. 27, 2023.

* cited by examiner

COMPUTER IMPLEMENTED METHOD FOR GUIDING TRAFFIC PARTICIPANTS

This application is the U.S. national phase of International Application No. PCT/EP2020/051939 filed Jan. 27, 2020 which designated the U.S. and claims priority to AT Patent Application No. A 141/2019 filed Apr. 18, 2019, the entire contents of each of which are hereby incorporated by reference.

BACKGROUND OF THE INVENTION

Field of the Invention

The invention relates to a computer implemented method for guiding a traffic participant, especially a pedestrian, especially a visually impaired or blind person, especially for guiding in urban environments, between at least two places.

Description of the Related Art

With the public accessibility of the Global Positioning System (GPS) and the development of continuously stronger, transportable computational devices—such as smartphones—the use of computerized navigational systems has become wide spread among motorized and unmotorized traffic participants alike. However, visually impaired and blind people who probably need assistance the most when navigating in traffic cannot use the current navigational systems.

SUMMARY OF THE INVENTION

Hence it is an object of the invention to overcome the aforementioned obstacles and drawbacks and to provide a navigational system that can be used by any traffic participants and in particular by visually impaired and blind people.

This problem is solved by the method disclosed and claimed.

Further preferred and advantageous embodiments of the invention are also disclosed.

In the following a depiction of a preferred embodiment of the invention and the problems within the current technology are described.

The described embodiments and aspects are solely meant to exemplify the invention and its related problems, which is not limited to the shown examples but may be implemented in a wide range of applications.

BRIEF DESCRIPTION OF THE DRAWINGS

The invention will be described with reference to the included drawings, in which.

DESCRIPTION OF THE PREFERRED EMBODIMENTS

Figure 1:
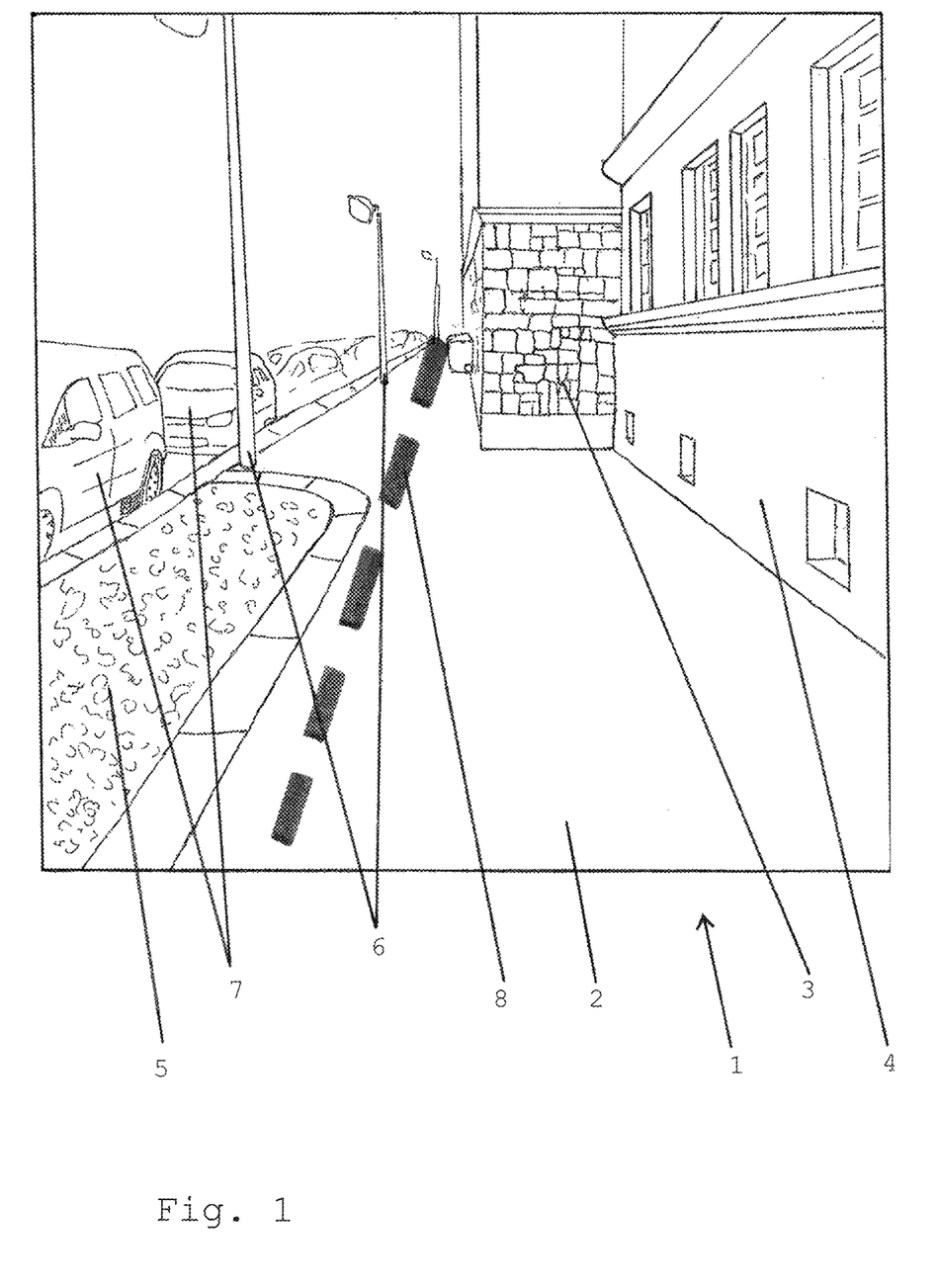
FIG. 1 shows a draft urban scene exemplifying the problem.

FIG. 1 shows an urban scene 1 with a pavement 2, a building 3 that is built closer to the street, a building 4 that is built more distant from the street, a flower bed 5, lamp posts 6 and parked cars 7. FIG. 1 also shows an exemplary route 8 as it might be calculated by a conventional navigational system. It can be clearly seen, that the actual route taken by a pedestrian normally would deviate from the shown straight line and take the flower bed 5 and the building 3 closer to the street into consideration. However, this action requires the pedestrian to know about the flower bed 5 or the irregularly placed houses 3, 4. This information can be easily acquired by simply being at the scene and seeing the placement of the aforementioned urban elements. But with the lack of visual information to assess the scene the given route 8 is insufficient and can even be dangerous, for example by causing a blind person to stumble over the edge of the flower bed 5 which occasionally cannot even be detected by a white cane.

Figure 2:
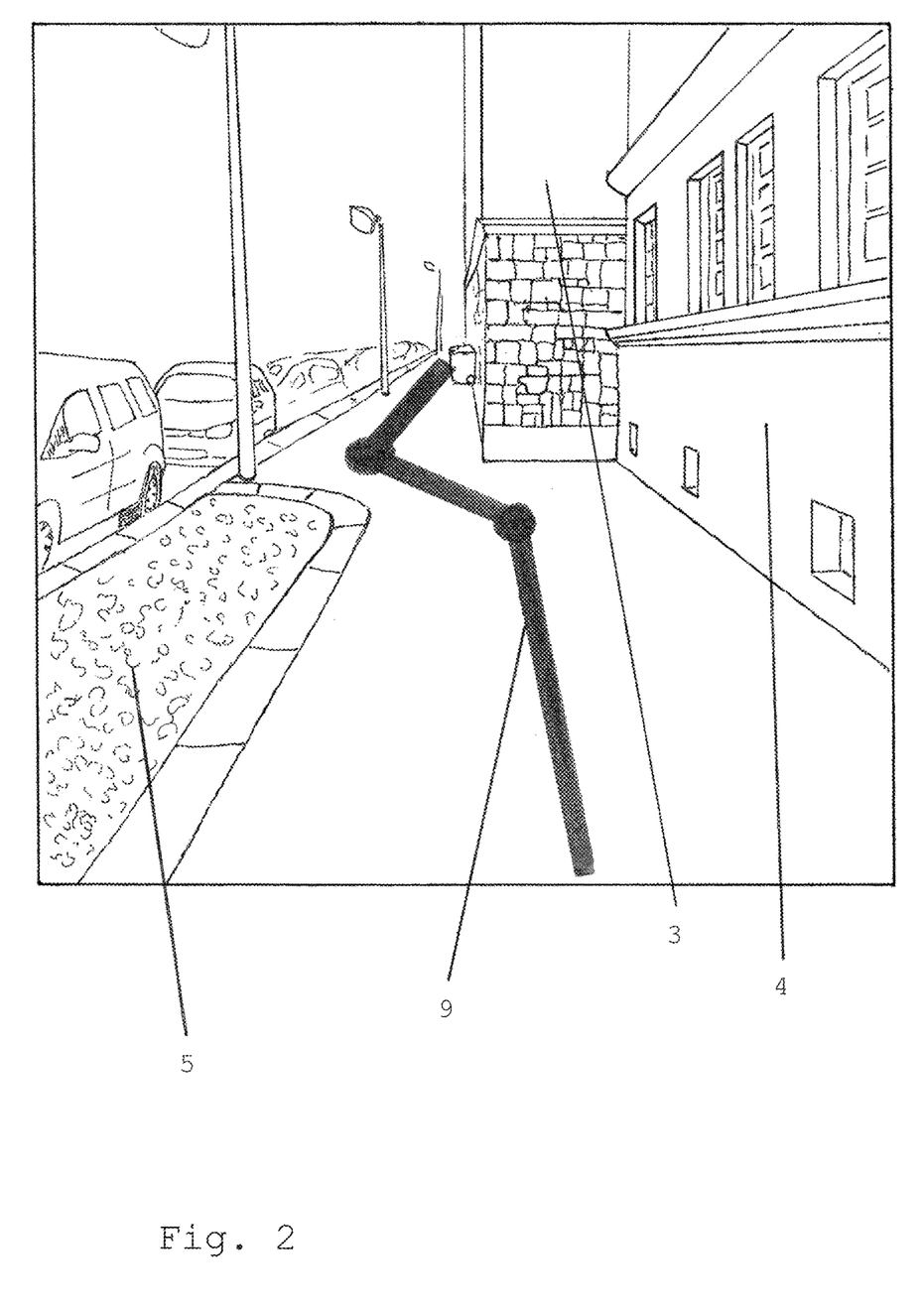
FIG. 2 shows the scene from FIG. 1 with a path that is generated according to the invention, FIG. 3 another urban scene with a path that is generated according to the invention, FIG. 4 a two-dimensional map, FIG. 5 an aerial view the region shown in FIG. 4, FIG. 6 a conventional three-dimensional map of the region shown in FIG. 4, FIG. 7 a depth image of the approximate region shown in FIG. 4, FIG. 8 a multi-modal three-dimensional map of a section of the region shown in FIG. 4, FIG. 9 the multi-modal three-dimensional map of FIG. 8 with a path that is generated according to the invention and FIG. 10 a flow chart roughly depicting a method of localizing a user of the system.

The scene shown in FIG. 2 is the same as shown in FIG. 1 with an improved path 9, that—if followed by a pedestrian—requires no adjustment due to obstacles. The flower bed 5 and the differently placed buildings 3, 4 are no longer a danger.

Figure 3:
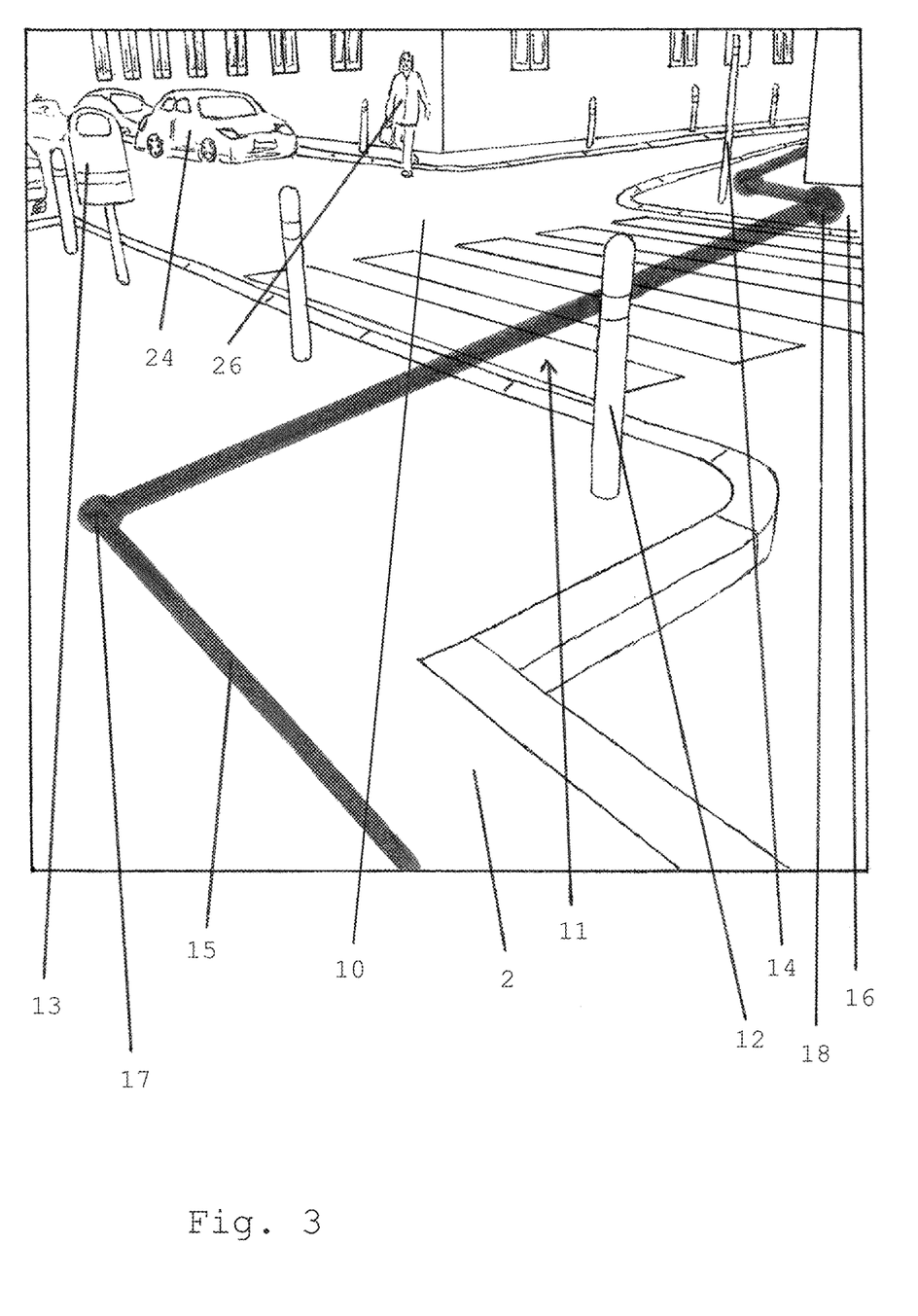

Two other problems are illustrated in FIG. 3. Firstly, there is the problem that arises when a visually impaired pedestrian wants to cross a street 10. Given that safety is of paramount importance, any route that requires the crossing of streets must be built so that zebra crossings 11 are always prioritized over other routes. Secondly, especially in urban surroundings, stationary installations like bollards 12, lamp posts 6 (see FIG. 1), trash bins 13, street signs 14 and the like are safety hazards that have to be circumvented. An optimized path 15 that meets these requirements is also shown in FIG. 3.

To create and efficiently use such an optimized path 9, 15 three major properties of the system are highly advantageous. Firstly, a route as precise and fine-granular as possible is to be defined on a map. Secondly, the location of the user ought to be known with very high accuracy and within very fine measurements, approximately within only a few centimeters, in order for a user to be able to follow the route. The usual "couple of meters"—accuracy provided by current technology such as GPS or magnetic sensors (mobile device compasses) are not sufficient. Thirdly, in order for a blind or visually impaired person to make use of the path information, it is to be conveyed in a way such that such a person can use it.

To accomplish this task, a guiding system for visually impaired or blind people according to the invention must include carrying out the Steps:

A. providing a multi-modal three-dimensional map,

B. calculating a route based on the multi-modal three-dimensional map connecting the at least two places over at least one intermediate waypoint, C. determining a precise location of the traffic participant, preferably by using the multi-modal three-dimensional map and D. setting beacons along the path at the waypoints.

A multi-modal three-dimensional map as it is provided in step A is derived from two or more different sources whereby each source adds another layer of information. A precise but conventional map may contain information on where the pavements and streets are, but it probably does not discern between pavement and flowerbeds. A (municipal) tree inventory can provide information on the location of trees; this is often combined with a garden and parks department where the precise location of public flower beds is charted. Municipal utilities can provide information on electricity (street lamps) and water (hydrants, manholes). The department responsible for traffic can provide plans where traffic lights, zebra crossings and the like are located.

Next to the aforementioned cartographic and geodetic information other sources can be added to a multi-modal three-dimensional map, such as: areal views, satellite pictures, surface texture data or conventional 3D-data. The latter being plain geometric information on three-dimensional objects like for example the shape and location of houses.

The list of possible sources to create a multi-modal three-dimensional map is not exhaustive and can be expanded to reflect the distinctive peculiarities of a city or region, for example cycling tracks on the pavements, spaces reserved for horse carriages, tramway tracks, stairs, the type of paving (especially cobble stones), monuments, (park) benches, drinking fountains, trash bins, bicycle stands, outdoor dining areas of restaurants or defibrillators.

Figure 4:
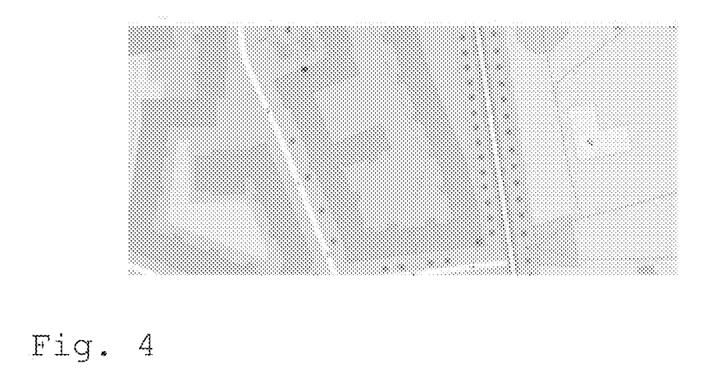
Figure 5:
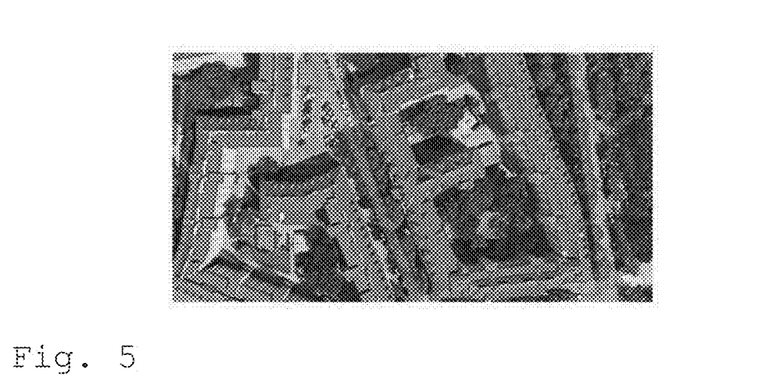
Figure 6:
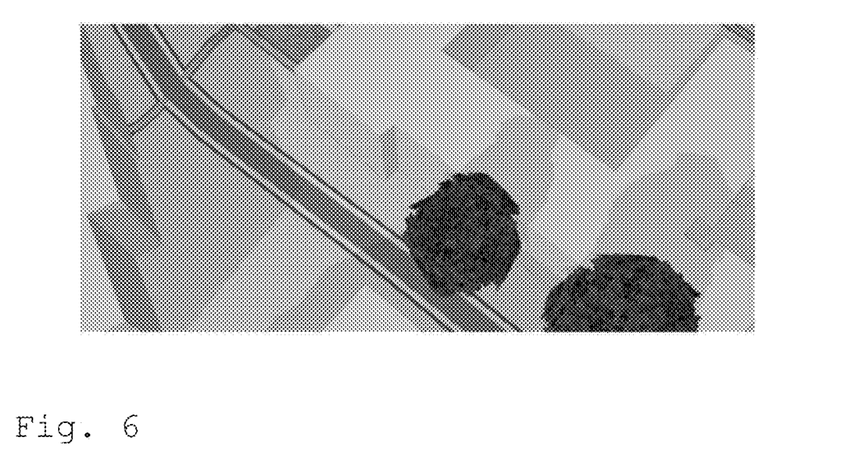
Figure 7:
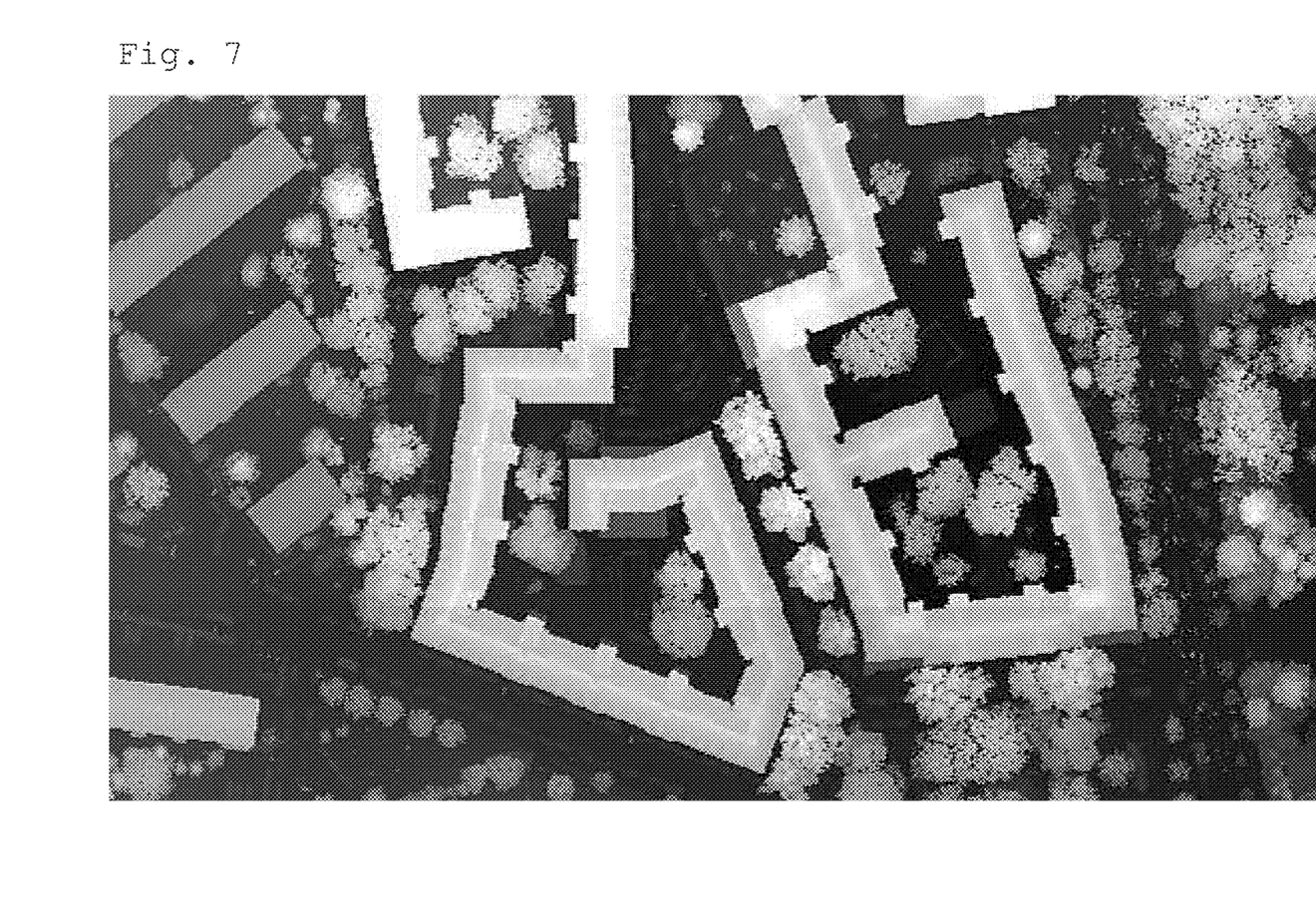

FIG. 4 to FIG. 6 show different examples for freely available maps and information that can be combined into a multi-modal three-dimensional map. FIG. 4 shows a two-dimensional map. FIG. 5 shows a reconstructed areal view, that is derived from satellite pictures with many different datasets from different satellites with different sensors. FIG. 6 shows a three-dimensional model of the region depicted in FIG. 4 and FIG. 5. FIG. 7 shows a so called "depth image" of the region shown in FIG. 4 to FIG. 6. A depth image shows distances along a defined axis, with more distant surfaces usually being depicted darker and closer surfaces being depicted lighter. In the example shown the defined axis is the vertical. Brighter parts of the depth image are in conclusion higher and darker parts flatter or lower. In the case of the urban scene the depth image in FIG. 7 hence shows the height of buildings and other structures.

All the data layers can be obtained from a multitude of available sources. A preferred way of obtaining data is through open sources. For example, the two-dimensional map data, the aerial view/map and conventional three-dimensional map data are available, in many cases without any usage limitation, e.g. from the OpenStreetMap Foundation. Moreover, other sources such as government institutions have publicly available geographic data about cities.

For example, the city of Vienna has the three previously mentioned sources as well as the aforementioned surface model from which one can extract the height of objects present at each of the points in the map. In total the city of Vienna has over 50 different datasets with several levels of detail that can be used to create a multi-modal three-dimensional map.

In a preferred embodiment of the invention the different layers of the multi-modal three-dimensional map are combined in a spatially coherent way. Spatial coherence can for example be achieved by defining objects and features, like houses, in a common coordinate system. By taking this step alone the layers are already aligned to some extent. Moreover, a more precise alignment can be obtained by using image registration methods, based on features present in both map layers (for example buildings in aerial view and two-dimensional layer) which are well known in the art. With this alignment, the location of objects which are only present in some layers (for example road limits or fire hydrants) can be correlated with all the other map features in the multi-modal map.

Figure 8:
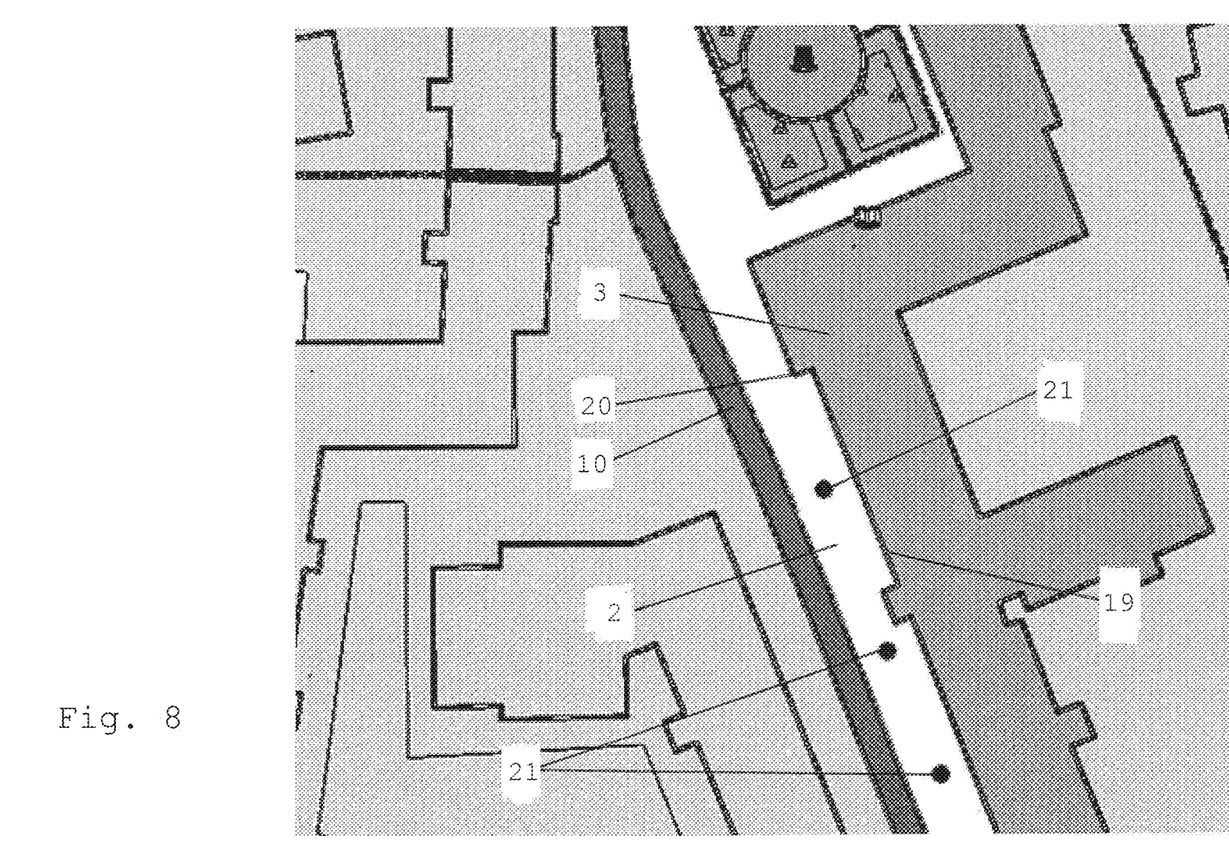

If combined the following information can be extracted from the different exemplary types of datasets shown in FIG. 4 to FIG. 7:

The three-dimensional layer, for example, can yield the information on the precise location of buildings' walls 19 (see FIG. 8) or edges 20 (see FIG. 8). A border 22 (see FIG. 9) between pavement 2 and street 10 can be extracted from the aerial view. A combination between the depth image and three-dimensional map yields very good estimations on the correct location of trees (see obstacles 21 in FIG. 8) for example. All sources of information mentioned in this example that is located in the city of Vienna are freely available open data from the city government and other non-governmental sources. A multi-modal three-dimensional map can also be very useful independently of the invention, for example when automatically guiding autonomous vehicles or planning the transport of large objects on the street.

According to a further embodiment of the invention, at least one walkable space is defined within the multi-modal three-dimensional map. The walkable space can be according to a very simple example every pavement minus everything that is not pavement, for example pavement minus every bench, trash bin, sing post, lamp post, bollard, flower bed, etc. In this case the walkable spaces can be defined automatically. Of course, the walkable spaces can also be defined manually.

Next to the essentially stationary, aforementioned objects other aspects can also be taken into consideration. For example, the entrance area of a very busy shop can be excluded from the walkable space and circumvented.

Accordingly step B is preferably carried out based on the multi-modal three-dimensional map especially based on the walkable space.

Also, when carrying out step B (calculating a path) two walkable spaces can be connected via at least one waypoint. Furthermore, if two or more walkable spaces are not bordering each other within the multi-modal three-dimensional map, at least one transitioning space is defined and a transitioning space bridges a gap between said two or more walkable spaces.

This is illustrated in FIG. 3. The pavement 2 is not directly bordering the other remote pavement 16. They are connected via two waypoints 17, 18. Between them there is a zebra crossing 11. In this case the zebra crossing 11 is the transitioning space that bridges the gap between the two pavements 2, 16. Other types of transitioning spaces can for example be traffic lights and way between them. However, even stairs or spaces with difficult pavement like cobble stones can be transitioning spaces, if they are not considered to be a safe walking space.

Figure 9:
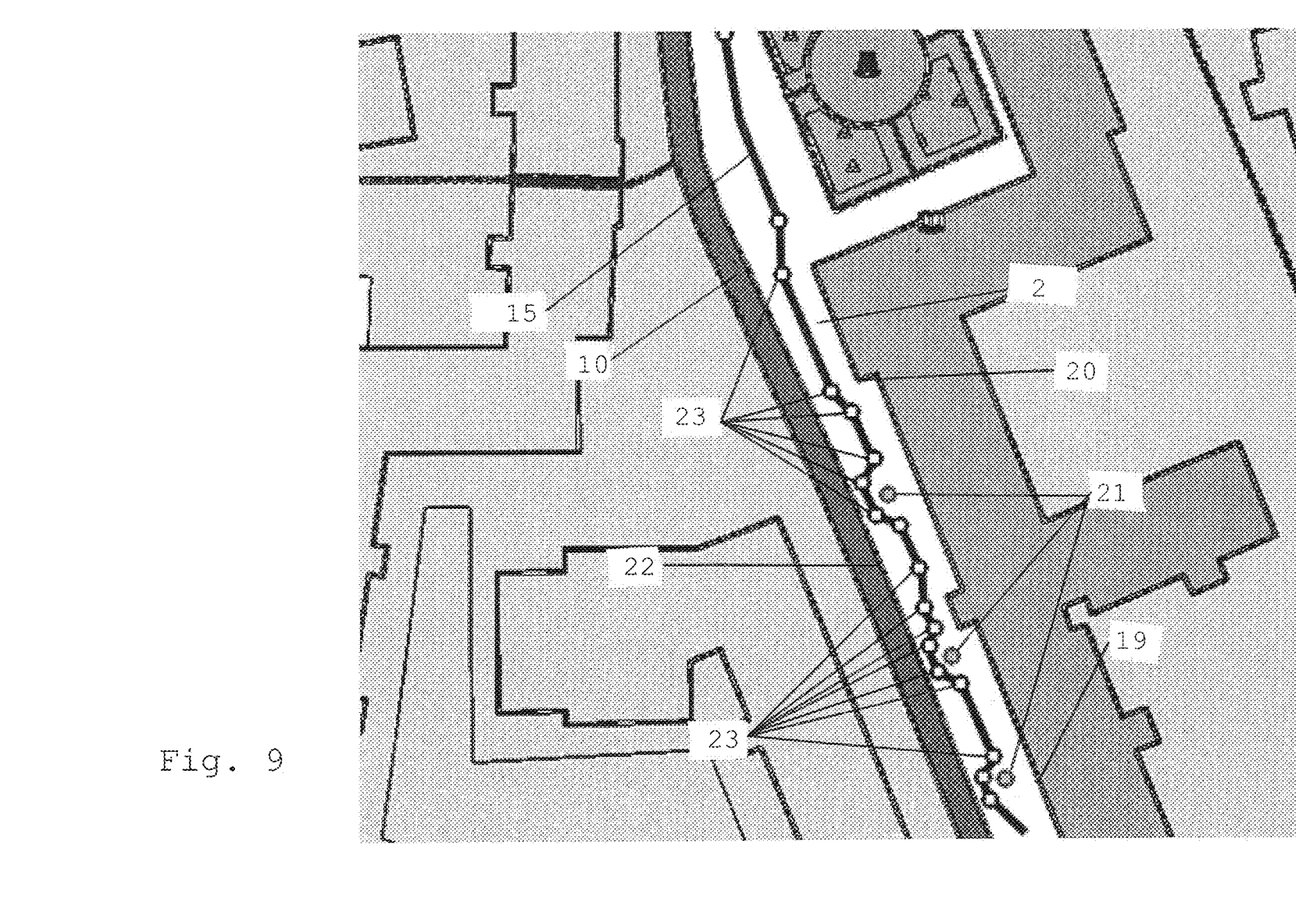

Another aspect of the invention is illustrated in FIG. 8 and FIG. 9. They show a very simplified example of a two-dimensional view of a multi-modal three-dimensional map.

The multi-modal three-dimensional map shows the building 3, the street 10 and the pavement 2 just as a normal map would show. However, grace to the additional layers of information the correct location of the building's 3 walls 19 and edges 20 are correctly noted with their actual location. Trees 21 have been registered and placed accordingly. The same applies for the now correctly noted border 22 between pavement 2 and street 10.

According to one preferred embodiment of the invention at least one obstacle is identified and marked in the multi-modal three-dimensional map and at least one waypoint is set to circumvent said obstacle.

As can be seen in FIG. 9 a path 15 has been created along several waypoints 23 that are circumventing obstacles, such as walls 19, corners 20, trees 21, and avoiding the border 23 between street 10 and pavement 2.

When setting the waypoints 23 automatically or manually it is important to try to be at a maximum distance to any spaces that are not walkable spaces. An easy way to find suitable places for waypoints could be to identify any bottleneck and to place the waypoints essentially in the middle of the bottleneck to achieve a maximum distance to all spaces that are not walkable spaces.

In order to follow the now created path, the precise location of the person (or vehicle/drone) has to be known. This can preferably be done by locating a device that is used to carry out the computer implemented method, for example a smartphone 101. However, the methods to locate devices are not precise enough to safely tell where along a path the device is located or if on or near the path at all.

Figure 10:
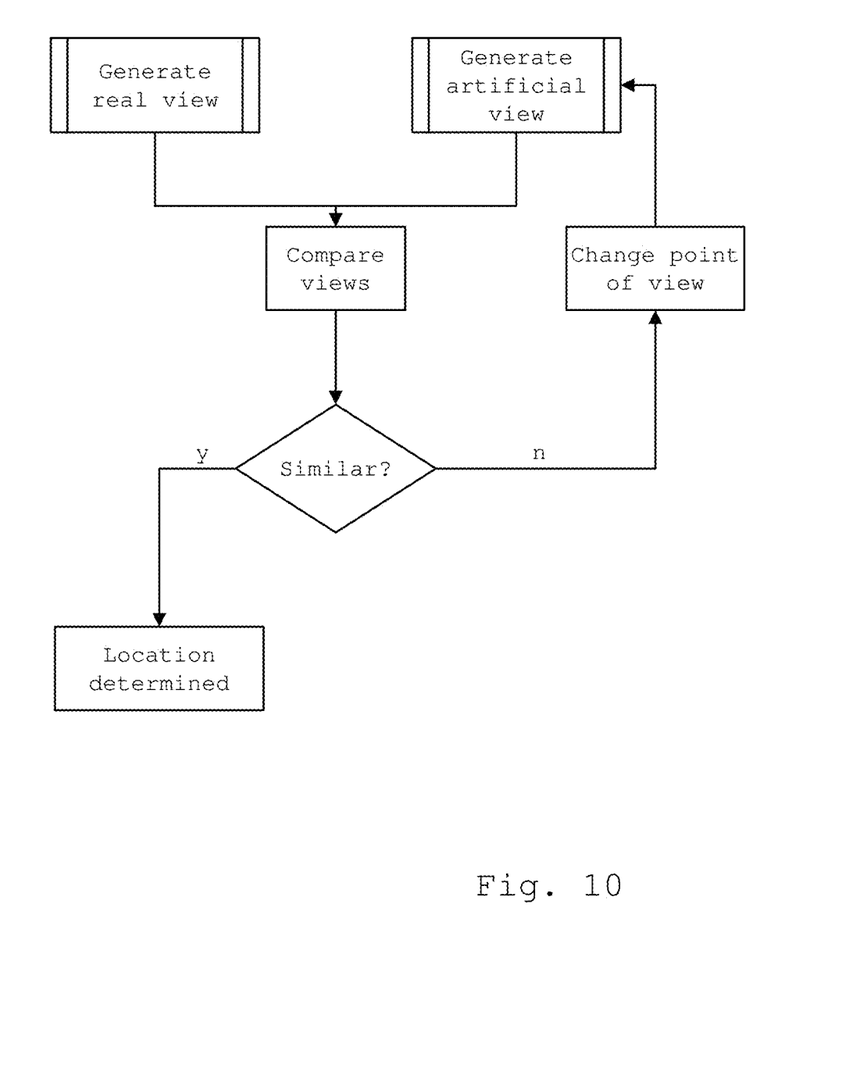

One possible method to determine the precise location of the traffic participant during step C of the invention is shown in the flow-chart in FIG. 10.

The depicted preferred embodiment includes the following sub-steps:
a. acquiring a real view by processing at least one digital picture of the surrounding,
b. generating at least one possible artificial view based on a raw location, the raw location providing a scene that is part of the multi-modal three-dimensional map and that is being depicted to provide the artificial view,
c. comparing the artificial view and the real view,
d. if the artificial view and the real view are essentially the same, providing location as the point of view the artificial view was generated from, and completing the subprocess,
e. if the artificial view and the real view are not essentially the same repeating the subprocess with at least one different artificial view.

Figure 11:
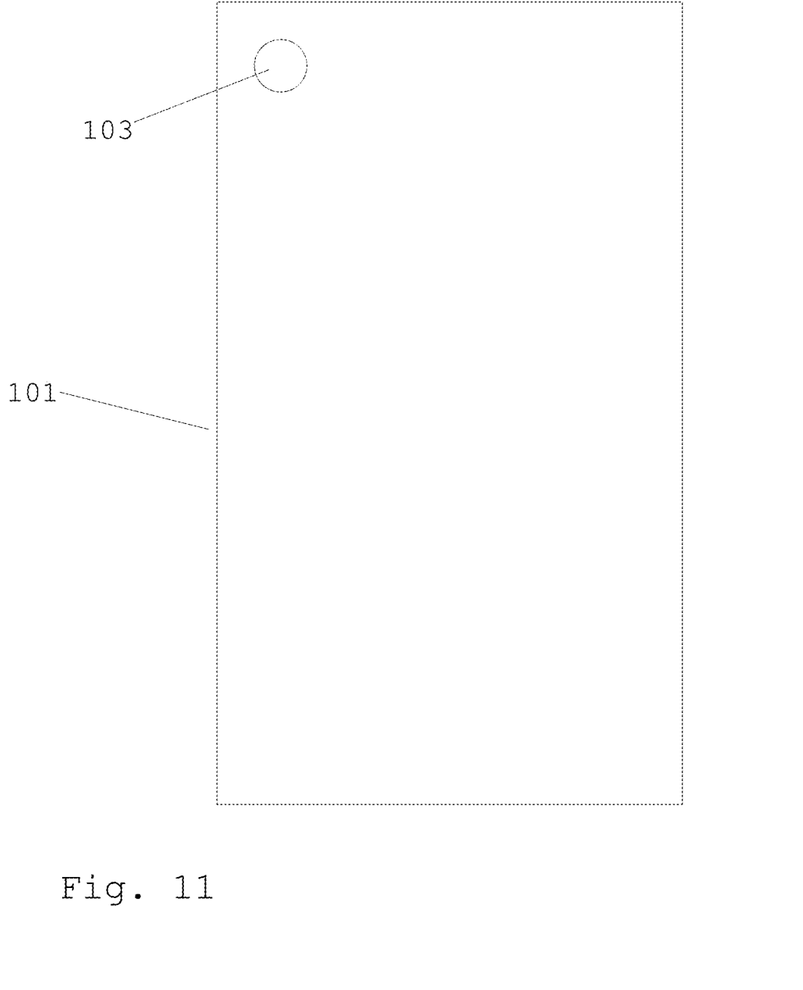
FIG. 11 a schematic representation of a smartphone.

Step a. can be simply carried out by photographing the scene in front of the device that is used to carry out the process. If the device is a smartphone 101, the smartphone camera 103 can be used.

Filming a scene is also considered taking photographs since filming basically is taking photographs with a (higher) frame rate.

A succession of pictures that is strung together to create a lager real view is also considered to be within the scope of the invention.

Then at least one artificial view is created. This can be done for example by using a ray-caster as it is well known to those skilled in the art. A simple ray-caster casts rays from a certain point of view through a 3D-surface and renders the first surface the ray(s) meet. More sophisticated ray-casters can take material into consideration and for example even render a view as if it has passed through glass. However, for this embodiment of the invention a very simple ray-caster is sufficient. Other methods of rendering 3D-images may also be employed. In case of this embodiment the 3D-surface is the multi-modal three-dimensional map.

The point of view is a raw location. The raw location can be obtained by any known locating means, for example GPS, magnetic sensors or an inertial navigation system that uses motion sensors like accelerometers and gyroscopes. The raw location estimation can also be improved by considering part or all of the previous known precise locations in the map. This information can be used, together with geometrical constraints (like walls) of the map, to reduce uncertainty in current raw location estimated from the sensor. For example, a person cannot stand where there are buildings or trees.

The artificial view and the real view are then being compared. If they are essentially the same, the point of view of the artificial view is considered the traffic participant's location. If they are not the same, further artificial views are compared to the real view until a location has been determined.

One problem that can impede the aforementioned method to determine a location is that the view of the camera that takes the picture that is used to create the real view is obstructed. These obstructions can be any objects that are between the surfaces and objects of the multi-modal three-dimensional map and the camera. Usual causes for such an obstruction are dynamic objects that can be part of the scenery but are not captured by the multi-modal three-dimensional map, such as cars 24, pedestrians 25 (see FIG. 3 for both), non-permanent art installations or advertisements such as A-frames.

Even if the threshold to consider the real view and the artificial view is set very coarse, a high number of dynamic objects can lead to false negatives when comparing views. To avoid this problem, when processing the digital picture to create the real view a sub-step "i. Removing of dynamic objects from the picture" is carried out. One possible means to remove dynamic objects is by identifying them with an artificial intelligence, for example a convolutional neural network that is trained to identify pedestrians, cars, bicycles and the like in pictures.

The described method of determining a location can be advantageously implemented independent of the invention. It can be used in combination with the aforementioned other characteristics of the invention or on its own.

Once the precise location has been determined the relation between a user and its surroundings is known and an augmented reality that precisely fits reality can be created.

The user in this case does not need to be known in the art. It suffices if he is simply capable of operating the device on which the method is carried out, e.g. using a smartphone 101.

According to a preferred embodiment of the invention the beacons from step D are perceptible within said augmented reality.

For example, the perceptible beacons can be superimposed into the field of vision of a pair of smart glasses, within the picture that was taken to determine the location or within a camera view of the aforementioned device.

However, these means are of little to no help to visually impaired or blind users. Therefore, according to a further preferred embodiment of the invention the method is characterized in that the augmented reality is acoustic and that the beacons are audible at their respective locations. This can be realized for example via headphones that simulate noises at certain locations. In a simpler exemplary embodiment, the device itself generates a sound that gets louder when pointed towards the nearest beacon and lower when pointed away. When a beacon/waypoint has been reached a sound can be played to indicate that the sound for the next beacon is now played. Using a stereo technique, the sound can also be heard louder in the left speaker when the waypoint is at the left of the user and louder in the right speaker when the waypoint is at the right of the user. In a preferred embodiment, binaural virtual audio (also known as spatial audio or 3D audio) can be used. In this case, the device processes an audio source to simulate to the user that the sound is coming from the actual spatial location of the waypoint. As this technique simulates the way humans perceive direction and distance of a sound source, it is ideal to guide users through the path since it is a true means to implement virtual audio sources in space (audio augmented reality).

It is also preferred that only one beacon is active at a time. Preferably only the closest beacon along the path is active and it is switched to the next when the user reaches the respective waypoint.

The described method to guide people can be implemented advantageously independent of the invention and used for guiding systems that are based on other methods, for example for guiding people within a building. A possible method to locate the user relative to his surrounding could then for example be the use of RFID transponders within the building and a corresponding RFID chip on the user.

The augmented reality can of course contain further indicators, for example when reaching or crossing transitioning spaces or what type of transitioning space there is (zebra crossing, traffic light, stairs, ramp, lift, escalators and so on . . . ).

In general, every element that is noted in the multi-modal three-dimensional map can be part of the augmented reality.

A traffic participant according to the invention can not only be a pedestrian but also a bicycle rider, a drone, a car or the like.

1 urban scene 14 street sign
2 pavement 15 path
3 building 16 pavement (not
4 building connected)
5 flower bed 17 waypoint
6 lamp posts 18 waypoint
7 cars 19 wall
8 route 20 edge/corner
9 path 21 tree
10 street 22 border
11 zebra crossing 23 waypoints
12 bollard 24 cars
13 trash bin 25 pedestrians

The invention claimed is:

1. A method carried out on a computer-controlled device operated by a traffic participant and equipped at least with a processor and a camera, for guiding the traffic participant between at least two places, the method implemented by the processor of the computer-controlled device and comprising the steps of:
   A. providing a multi-modal three-dimensional map;
   B. calculating a route to be traversed by the traffic participant based on the multi-modal three-dimensional map connecting the at least two places over at least one intermediate waypoint;
   C. determining a precise location of the traffic participant; and
   D. setting beacons along the route at the waypoints, wherein step C is carried out via a subprocess with the following sub-steps:
      a. acquiring a real view by processing at least one digital picture of the surrounding captured by the camera;
      b. using ray-casting to generate at least one possible artificial view based on a raw location, the raw location providing a scene that is part of the multi-modal three-dimensional map and that is being depicted to provide the artificial view;
      c. comparing the artificial view and the real view;
      d. if the artificial view and the real view are essentially the same, providing a location from a point of view the artificial view was generated from; and
      e. if the artificial view and the real view are not essentially the same, repeating the subprocess beginning at sub-step b wherein the generated at least one possible artificial view is a different generated artificial view.

2. The method according to claim 1, wherein the multi-modal three-dimensional map is created from at least two sources.

3. The method according to claim 2, wherein the at least two sources in step A contain at least one or more of the following: two-dimensional map data, satellite images, conventional three-dimensional information, topographic maps, (municipal) street tree inventories, hydrants plans, street constructions plans, and surface texture for three-dimensional models and aerial views.

4. The method according to claim 2, wherein the multi-modal three-dimensional map is created from at least three sources.

5. The method according to claim 1, wherein within the multi-modal three-dimensional map at least one walkable space is defined.

6. The method according to claim 5, wherein step B is carried out based on the walkable space within the multi-modal three-dimensional map.

7. The method according to claim 5, wherein two walkable neighboring spaces are connected via at least one waypoint.

8. The method according to claim 5,
   wherein during step A within the multi-modal three-dimensional map at least one transitioning space is defined, and
   wherein the transitioning space bridges a gap between at least two walkable spaces that are not bordering each other.

9. The method according to claim 1,
   wherein at least one obstacle is identified and marked in the multi-modal three-dimensional map, and
   wherein at least one waypoint is set to circumvent said obstacle.

10. The method according to claim 1, wherein sub-step a contains the further sub-step of:
    i. removing dynamic objects from the digital picture.

11. The method according to claim 10, wherein the dynamic objects are one or more from the list containing: cars, other pedestrians, animals, movable trash bins, A-signs, mobile advertising installations, and bicycles.

12. The method according to claim 1,
    wherein with the precise location of step C and the multi-modal three-dimensional map from step A, an augmented reality around the traffic participant is created, and
    wherein the beacons from step D are perceptible in said augmented reality.

13. The method according to claim 12,
    wherein the augmented reality is acoustic, and
    wherein the beacons are audible at their respective locations.

14. The method according to claim 1,
wherein only one or two beacons are active simultaneously, and
wherein the one or two active beacons are the most proximate in a direction of the path.

15. A non-transitory computer-readable medium on which is stored a series of instructions that, when executed by a processor of a computer, cause the computer to perform the method according to claim 1.

16. The method according to claim 1, wherein the determining step uses the multi-modal three-dimensional map.

17. A device for guiding a traffic participant between at least two places, comprising:
a processor; and
a camera in communication with the processor,
the processor configured to carry out a computer implemented method including the following steps:
A. providing a multi-modal three-dimensional map;
B. calculating a route to be traversed by the traffic participant based on the multi-modal three-dimensional map connecting the at least two places over at least one intermediate waypoint;
C. determining a precise location of the traffic participant; and
D. setting beacons along the route at the waypoints, wherein step C is carried out via a subprocess with the following sub-steps:

a. acquiring, via the camera, a real view by processing at least one digital picture of the surrounding captured by the camera,
b. generating at least one possible artificial view by means of a ray-caster based on a raw location, the raw location providing a scene that is part of the multi-modal three-dimensional map and that is being depicted to provide the artificial view,
c. comparing the artificial view and the real view,
d. if the artificial view and the real view are essentially the same, providing location as the point of view the artificial view was generated from, and completing the subprocess, and
e. if the artificial view and the real view are not essentially the same repeating the subprocess beginning at sub-step b wherein the generated at least one possible artificial view is a different generated artificial view.

18. The device according to claim 17, wherein the device is a smartphone.

19. The method according to claim 17, wherein the multi-modal three-dimensional map is created from at least two sources.

20. The method according to claim 17,
wherein at least one obstacle is identified and marked in the multi-modal three-dimensional map, and
wherein at least one waypoint is set to circumvent said obstacle.

* * * * *